(12) United States Patent
Abe et al.

(10) Patent No.: US 8,964,327 B2
(45) Date of Patent: Feb. 24, 2015

(54) TAPE STORAGE DEVICE, DATA WRITING METHOD, AND PROGRAM

(75) Inventors: Atsushi Abe, Yamato (JP); Katsuhiko Hagiwara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/473,762

(22) Filed: May 17, 2012

(65) Prior Publication Data

US 2012/0293886 A1 Nov. 22, 2012

(30) Foreign Application Priority Data

May 19, 2011 (JP) .................. 2011-112885

(51) Int. Cl.
G11B 5/008 (2006.01)
G06F 3/06 (2006.01)

(52) U.S. Cl.
CPC ............ G06F 3/0613 (2013.01); G06F 3/0659 (2013.01); G06F 3/0682 (2013.01); G11B 5/008 (2013.01); G11B 2220/90 (2013.01)
USPC .................... 360/90; 360/71; 360/55; 360/51

(58) Field of Classification Search
CPC ...... G11B 5/02; G11B 5/008; G11B 5/00813; G11B 5/78; G11B 2220/90; G06F 3/0682; G06F 3/0659; G06F 3/0613
USPC .......... 360/51, 52, 55, 83, 90, 134, 71, 73.01, 360/77.12, 78.02, 291, 241
See application file for complete search history.

(56) References Cited

U.S. PATENT DOCUMENTS

| | | | |
|---|---|---|---|
| 5,325,370 A * | 6/1994 | Cleveland et al. | 714/755 |
| 5,526,198 A * | 6/1996 | Dodt et al. | 360/48 |
| 6,571,304 B1 * | 5/2003 | Basham et al. | 710/53 |
| 6,856,479 B2 | 2/2005 | Jaquette et al. | |
| 6,865,043 B2 | 3/2005 | Ataku et al. | |
| 6,950,257 B1 * | 9/2005 | Greco et al. | 360/48 |
| 6,958,878 B2 * | 10/2005 | Jaquette et al. | 360/73.04 |
| 6,970,311 B2 | 11/2005 | Jaquette | |
| 7,107,397 B2 | 9/2006 | Dahman et al. | |
| 7,119,974 B2 | 10/2006 | Jaquette | |
| 7,218,468 B2 | 5/2007 | Jauette et al. | |
| 7,236,322 B2 | 6/2007 | Greco et al. | |
| 7,350,021 B2 * | 3/2008 | Itagaki et al. | 711/111 |
| 7,511,915 B2 | 3/2009 | Greco et al. | |
| 7,535,664 B1 | 5/2009 | Gill | |

(Continued)

FOREIGN PATENT DOCUMENTS

| | | |
|---|---|---|
| JP | 02130625 A | 5/1990 |
| JP | 2004-341925 | 12/2004 |

(Continued)

*Primary Examiner* — Thomas Alunkal
(74) *Attorney, Agent, or Firm* — Griffiths & Seaton PLLC (57) ABSTRACT

A tape drive receives multiple write requests for data pieces and a synchronization request corresponding to the write requests from a device, performs a synchronization process, and returns a completion status of the synchronization request. The tape drive includes a write controller that stores data pieces transferred from the device in the buffer, according to a first write request, receives a first synchronization request and then a subsequent write request for at least one data piece, and returns the completion status when processing for the first synchronization request is completed and the subsequent write request is received with a command queuing function.

20 Claims, 6 Drawing Sheets

(56) References Cited

U.S. PATENT DOCUMENTS

| | | | |
|---|---|---|---|
| 7,561,372 B2 * | 7/2009 | Shiratori | 360/77.12 |
| 7,631,141 B2 | 12/2009 | Watanabe | |
| 7,903,363 B2 | 3/2011 | Itagaki et al. | |
| 8,035,912 B2 * | 10/2011 | Katagiri et al. | 360/73.08 |
| 2003/0142428 A1 * | 7/2003 | Jauette et al. | 360/51 |
| 2003/0142429 A1 * | 7/2003 | Ataku et al. | 360/51 |
| 2007/0053091 A1 * | 3/2007 | Shiratori | 360/8 |
| 2008/0304174 A1 * | 12/2008 | Itagaki et al. | 360/73.01 |

FOREIGN PATENT DOCUMENTS

| | | |
|---|---|---|
| JP | 2006-318571 | 11/2006 |
| JP | 2008-146760 | 6/2008 |
| JP | 2008165881 A | 7/2008 |
| JP | 2009289349 A | 12/2009 |
| WO | 2008-533636 | 8/2008 |

* cited by examiner

TAPE STORAGE DEVICE, DATA WRITING METHOD, AND PROGRAM

CROSS-REFERENCE TO RELATED APPLICATIONS

This application is based upon and claims priority from prior Japanese Patent Application No. 2011-112885 filed on May 19, 2011, the entire disclosure of which is herein incorporated by reference.

BACKGROUND

The invention relates to a writing method and system for receiving write data without a backhitch after a synchronization request.

A tape recording device (hereinafter, also referred to as a tape drive or a drive) configured to write data to a tape medium (also referred to as a tape) such as a magnetic tape medium accumulates data temporarily in a buffer. The data stored in the buffer is generally written from the buffer to a tape medium at any timing convenient to the drive. A host ensures that all the data sent to the drive are written to the tape medium. In order to reliably ensure this data recording, the host sends the drive a command (a WriteFM Non Immediate command which is also referred to as a "WriteFM0") for a forced writing of the data. Such a forced writing from the buffer to the tape medium is referred to as a "synchronization."

Meanwhile, unless the traveling of the tape medium is stopped after occurrence of a synchronization, a gap is generated on the tape medium between data written in a preceding synchronization and data written subsequently. This results in a waste of a recording area in the tape medium. For this reason, a backhitch needs to be performed. A backhitch is a series of operations that decrease the speed of the tape medium to stop the tape medium once, cause the tape medium to travel in a reverse direction and in a forward direction again to reach a position where next data should be written, and then write the data. The next data is not written until the backhitch is completed. A backhitch requires about 3 to 5 seconds and significantly degrades writing performance.

Recursive accumulating backhitchless flush (RABF) has been proposed as a technique for improving performance as it avoids data synchronization associated with a backhitch. However, RABF requires processing time for the movement between an accumulating backhitchless flush (ABF) and recursive wraps, writing the same data twice to the tape, and the like.

SUMMARY

An object of the invention is to provide a device configured to write data to a tape medium and a writing method by which write data is received without a backhitch even after a synchronization request is received.

In an exemplary embodiment, a tape drive receives multiple write requests for data pieces and a synchronization request corresponding to the write request from a device and that returns a completion status of a synchronization process (in which the data pieces stored in a buffer are recorded on a tape medium) to the device. The tape drive includes an interface that receives a command from the device, a buffer that temporarily stores the data pieces sent from the device, a tape medium on which the data pieces stored in the buffer are recorded, and a write controller that records the data pieces on the tape medium from the buffer. The interface includes a function capable of queuing multiple commands issued in succession from the device so as to asynchronously process the commands.

The write controller receives a first synchronization request and a subsequent write request for at least one data piece from the device; and returns the completion status when processing of the first synchronization request is completed and the subsequent write request is received with the command queuing. The data pieces transferred according to a first write request are stored in a buffer.

The write controller of the tape drive is characterized in that the write controller stores, as a position of the synchronization request, a buffer position at which the last one of the data pieces stored in the buffer is located at the time of receiving the synchronization request and stores multiple synchronization request positions as the function of a synchronization queue.

Another embodiment concerns a writing method by which a tape drive receives multiple write requests for data pieces and a synchronization request corresponding to the write requests from a device and returns a completion status of a synchronization process (in which the data pieces stored in a buffer are recorded on a tape medium) to the device.

The tape drive is capable of queuing multiple commands issued in succession from the device so as to asynchronously process the commands. The writing method includes the steps of: (a) storing, in the buffer, data pieces transferred from the device according to a first write request and receiving a first synchronization request and then a subsequent write request for at least one data piece; and (b) returning a completion status at timing when a process for the first synchronization request is completed after the subsequent write request is received with the function of queuing the commands.

In still another embodiment, a computer program is provided for data writing control that receives multiple write requests for data pieces and a synchronization request corresponding to the write requests from a device and that returns a completion status of a synchronization process (in which the data pieces stored in a buffer are recorded on a tape medium) to the device. The tape drive further includes a function capable of queuing multiple commands issued in succession from the device so as to asynchronously process the commands.

The program causes the computer to execute the steps of: (a) receiving a first synchronization request and a subsequent write request for at least one data piece from the device; and returning the completion status when processing of the first synchronization request is completed and the subsequent write request is received with the command queuing. The data pieces transferred according to a first write request are stored in a buffer.

Embodiments of the invention enable the completion of a synchronization process while improving the performance of writing data to a tape medium in response to a series of write requests.

DETAILED DESCRIPTION

Exemplary embodiments of the invention are now described in detail while referring to the drawings.

Embodiments of the invention relate to a system, method and program configured to write data to a tape medium in which data sent from a storage device is temporarily stored in a buffer. When the system receives a data synchronization request, subsequent write data is processed without a backhitch, and a completion status is returned to the storage device when a synchronization process is completed.

In a backhitch operation, a tape drive does not immediately write data from the host to a tape medium, but stores the data in a buffer in the drive. The drive starts the writing after a certain amount of data is accumulated in the buffer. From a writing performance viewpoint, it is desirable that the drive continues to write data while avoiding a backhitch as much as possible. In a normal writing, the drive writes data while accumulating data in the buffer, and thus the buffer is less likely to become empty during the writing, and a backhitch seldom occurs.

The host may request data synchronization (e.g., by sending a Synchronous command) which is a process of writing all the data in the buffer to the tape medium. Upon receiving a synchronization request, a conventional tape drive rejects receiving a Write command (a write request) until a synchronization process is completed. After receiving the synchronization request (Synchronous command), the conventional tape drive rejects data transfer to be performed according to the Write command until the synchronization process is completed. This means that the buffer in the drive is necessarily empty when the synchronization is completed, and a backhitch necessarily occurs for this reason.

A backhitch may cause the following problems.

1. A high frequency of synchronization leads to a high frequency of backhitch, which lowers the writing performance.

2. In order to prevent the performance from being lowered, the drive can write data without performing a backhitch (a backhitchless flush) even in response to a synchronization request. However, if the backhitchless flush is performed, the data is written at a low recording density, which reduces a capacity of the tape medium more than the normal operation.

Recursive accumulating backhitchless flush (RABF), as described in U.S. Pat. Nos. 6,856,479 and 6,865,043, addresses the above problems. Upon receipt of a synchronization request, data in the buffer which is yet to be written to a tape medium is written to a temporary recording area (ABF wrap) reserved on the tape medium by the tape drive while the tape medium is still traveling. This writing is a buffer flush without a backhitch (a backhitchless flush), because there is no problem with a gap between data written in the previous synchronization and data written in the next synchronization.

The tape drive recursively performs operations in which data is accumulated in the buffer and the data is rewritten to a normal recording area (normal wrap) when the buffer or the temporary storage area is full. RABF does not require a synchronization involving a backhitch in preparation for the next synchronization, and thus time required for a synchronization can be avoided. RABF significantly improves performance in the case of highly frequent synchronization requests relative to data amount.

However, RABF requires an extra processing time as a host needs to perform polling for two newly introduced commands. In order to check termination of a drive synchronization process, the host makes inquiries at regular intervals through an interface between the host and a drive. These inquiries degrades tape performance.

Figure 1:
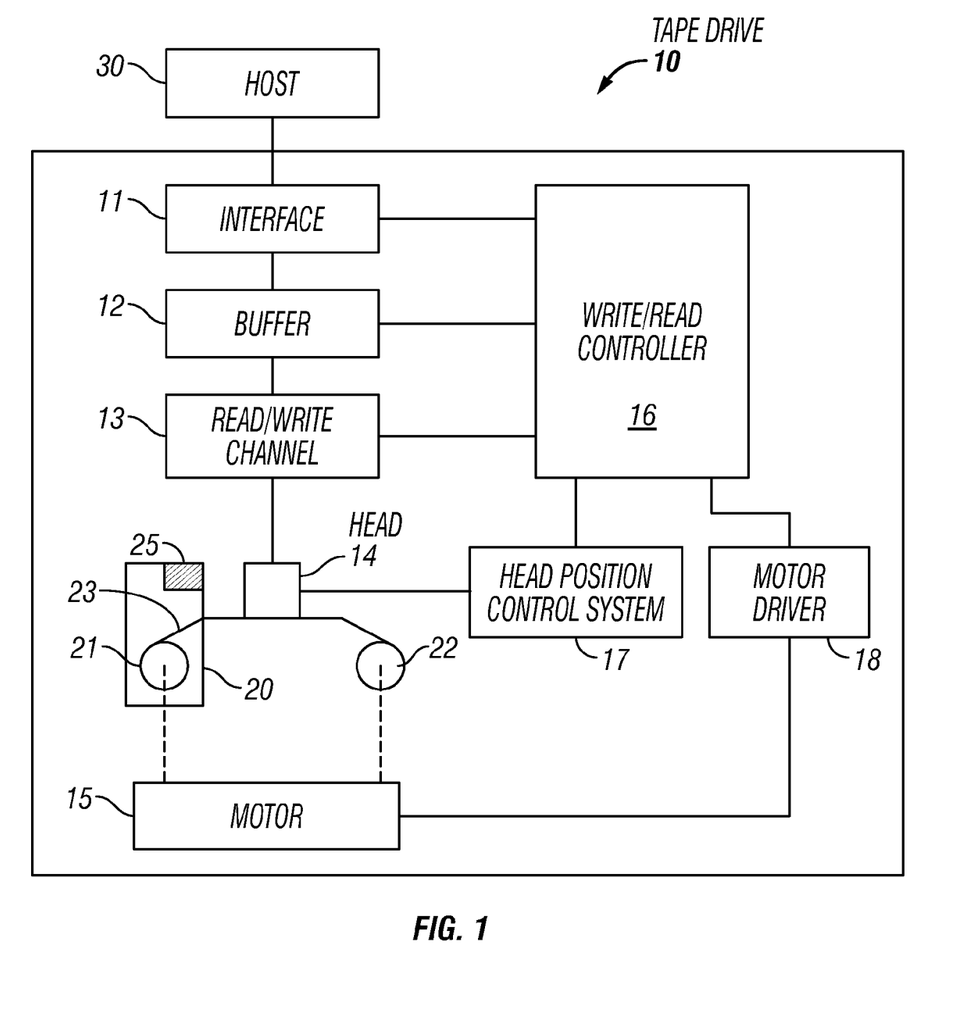
FIG. 1 shows a configuration example of a tape drive 10 to which embodiments of the invention are applicable.

FIG. 1 is a diagram showing a configuration example of a tape drive 10 to which the embodiment is applied. The tape drive 10 writes multiple data pieces sent from a host 30, to a tape medium on a fixed-length dataset basis. A dataset is an aggregation of multiple data pieces and is a unit of writing the data pieces to the tape medium having a fixed-length format structure. However, the invention does not exclude a case of a variable-length dataset.

The tape drive 10 includes a host interface (hereinafter, referred to as an interface) 11, a buffer 12, a channel 13, a head 14, and a motor 15. The tape drive 10 also includes a write/read controller 16, a head position control system 17, and a motor driver 18. Further, the tape cartridge 20 is also illustrated, since tape cartridge 20 is loadable on the tape drive 10 by being inserted into the tape drive 10. The tape cartridge 20 includes a tape 23 wound around reels 21, 22. With the rotation of the reels 21, 22, the tape 23 moves in a longitudinal direction from the reel 21 to the reel 22 or from the reel 22 to the reel 21. Note that a magnetic tape is illustrated as the tape 23, but a tape medium other than a magnetic tape may be used.

The interface 11 communicates with the host 30 which is an example of a device. For example, from the host 30, the interface 11 receives a command instructing for writing data to the tape 23, a command for moving the tape 23 to a target position, and a command instructing for reading data from the tape 23. SCSI is illustrated as a communication standard used for the interface 11. In SCSI, a first command corresponds to a Write command; a second command, a Locate command or a Space Command; and a third command, a Read command. The interface 11 also returns a response to the host 30, the response indicating whether a process in response to each of these commands has succeeded or failed.

The buffer 12 is a memory in which data pieces to be written to and read from the tape 23 are accumulated. For example, the buffer 12 is configured of a dynamic random access memory (DRAM). The buffer 12 is formed of multiple buffer segments, and each buffer segment stores therein a dataset which is a unit of reading from and writing to the tape 23. A single data set is constituted of: a part of one of data pieces transmitted from the host 30; or multiple data pieces. Data passed on through the read/write channel 13 is written to the tape 23 by the head 14 in dataset units (for example, 40 KB or 1.6 MB). A Synchronous command is a command for writing data stored in a buffer to a tape.

The channel 13 is a communication channel used for sending the head 14 data to be written to the tape 23 or for receiving from the head 14 data read from the tape 23. When the tape 23 moves in the longitudinal direction, the head 14 writes or reads information to or from the tape 23. The motor 15 rotates the reels 21, 22. Note that a single rectangle represents the motor 15, it is preferable to provide a total of two motors 15, one for each of the reels 21, 22. The write/read controller 16 controls the tape drive 10 on the whole. For example, the write/read controller 16 controls writing and reading data to and from the tape 23 in accordance with a command received by the interface 11. The write/read controller 16 also controls the head position control system 17 and the motor driver 18.

In an embodiment, a tape drive 10 requests a function of receiving subsequent data transfer according to a Write command before completing a synchronization previously requested by the host. A tape drive 10 supporting a queuing function executes a process in which the tape drive can write another data after receiving a synchronization request. Upon receipt of multiple commands, the tape drive 10 can execute transactions independently and asynchronously. The queuing function of the tape drive 10 is included in a SCSI interface or the like incorporated in the interface 11. In the embodiment, an application of the host (in charge of an application task) also issues multiple commands asynchronously even though the application of the host cannot ensure completion of transactions. This queuing function prevents a buffer in the drive from becoming empty, and thereby the drive can perform processing according to a synchronization request (Synchronous) without a backhitch.

In a SCSI interface, the tape drive 10 uses a WriteFilemark command as a synchronization request command. In response to this command, the tape drive 10 writes as many Filemarks as designated to the buffer, and then performs a synchronization process of writing all the data pieces in the buffer to a tape medium. If the tape drive 10 is to perform only a synchronization process without writing a Filemark, the host issues a WriteFM0 command with a Filemark field for writing set to "0."

Figure 2:
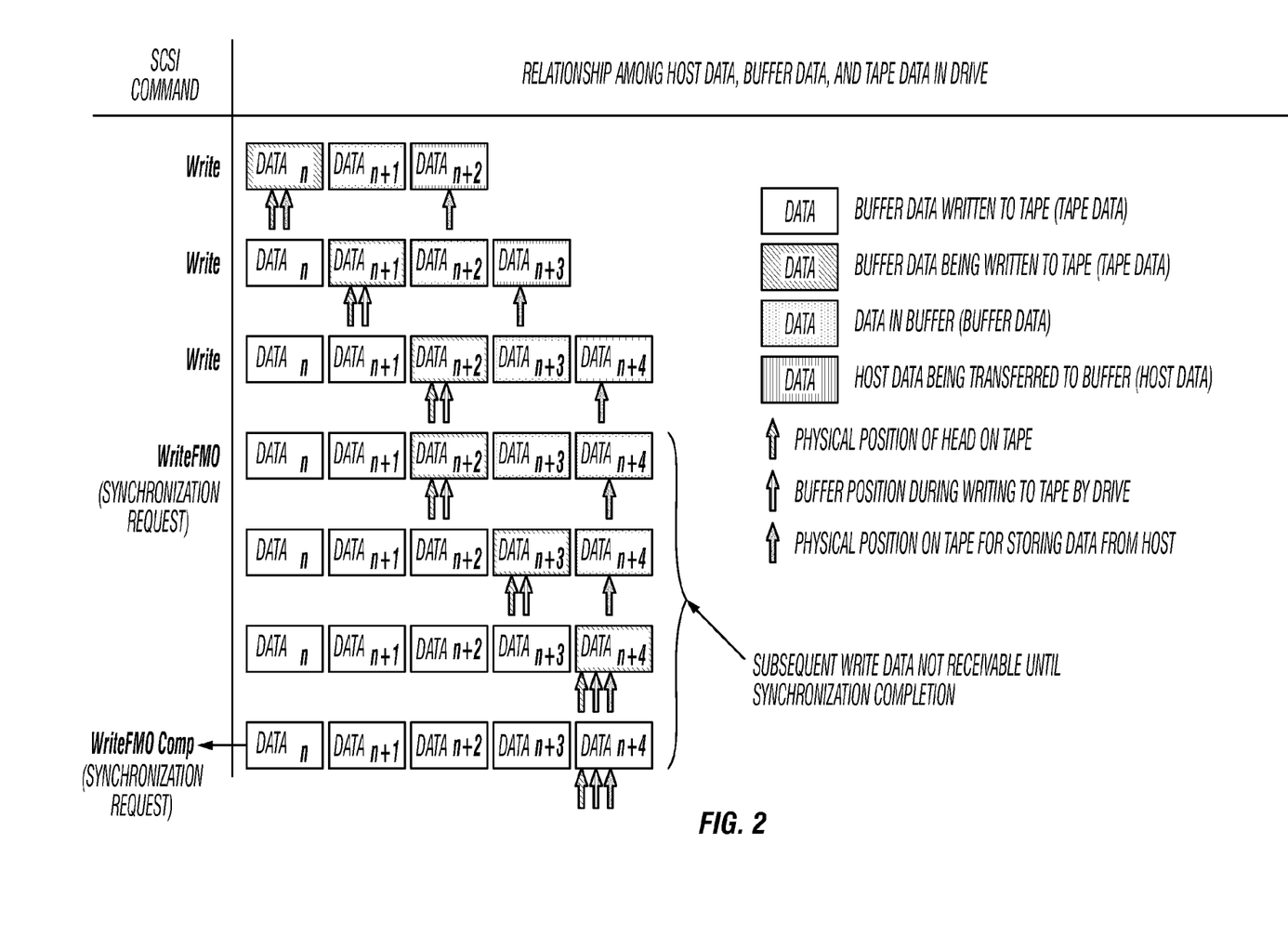
FIG. 2 shows a sequence of transactions performed in an existing tape drive for Write data and conventional synchronization requests (WriteFM0s).

FIG. 2 shows a sequence of transactions performed in a tape drive for Write data and conventional synchronization requests. The transaction sequence shows a relationship among host data pieces (data pieces being transferred from a host to the drive), buffer data pieces (data pieces stored in a buffer), and tape data pieces (buffer data pieces written to a tape) in the drive. The sequence shows transitions in which data pieces n, n+1, n+2, n+3, . . . are sent according to Write commands from the host with the elapse of time and are stored in segments of the buffer 12. The sequence shows that, after a synchronization request (WriteFM0) is received, subsequent Write data pieces n+5, n+6, . . . cannot be received until recording (a synchronization process) a preceding data piece n+4 on the tape is completed.

The tape drive ensures that data pieces stored in the buffer until immediately before receiving a synchronization command have been written to the tape medium at the time point when the tape drive sends a completion status (Comp) in response to the synchronization command. After the recording in response to the synchronization request is completed, the buffer becomes empty. A dotted circle shows that movement of a head involves a backhitch in the conventional synchronization process because each subsequent write data piece is written at a position of the tape immediately behind a position where a preceding data piece has been written.

Solid arrows in the dotted circle show a process during which a backhitch is performed on the tape so that a write position of the tape with respect to the head is moved to a position immediately behind a position where a preceding data piece has been written upon completion of the synchronization process. A dotted rectangle shows how the subsequent Write data pieces n+5, n+6, n+7, and . . . are received after the preceding WriteFM0 is completed (Comp). Without the backhitch, subsequent data pieces are written at skipped positions. Thus, a recording capacity of a tape medium is reduced, and the read rate is lowered.

Figure 3:
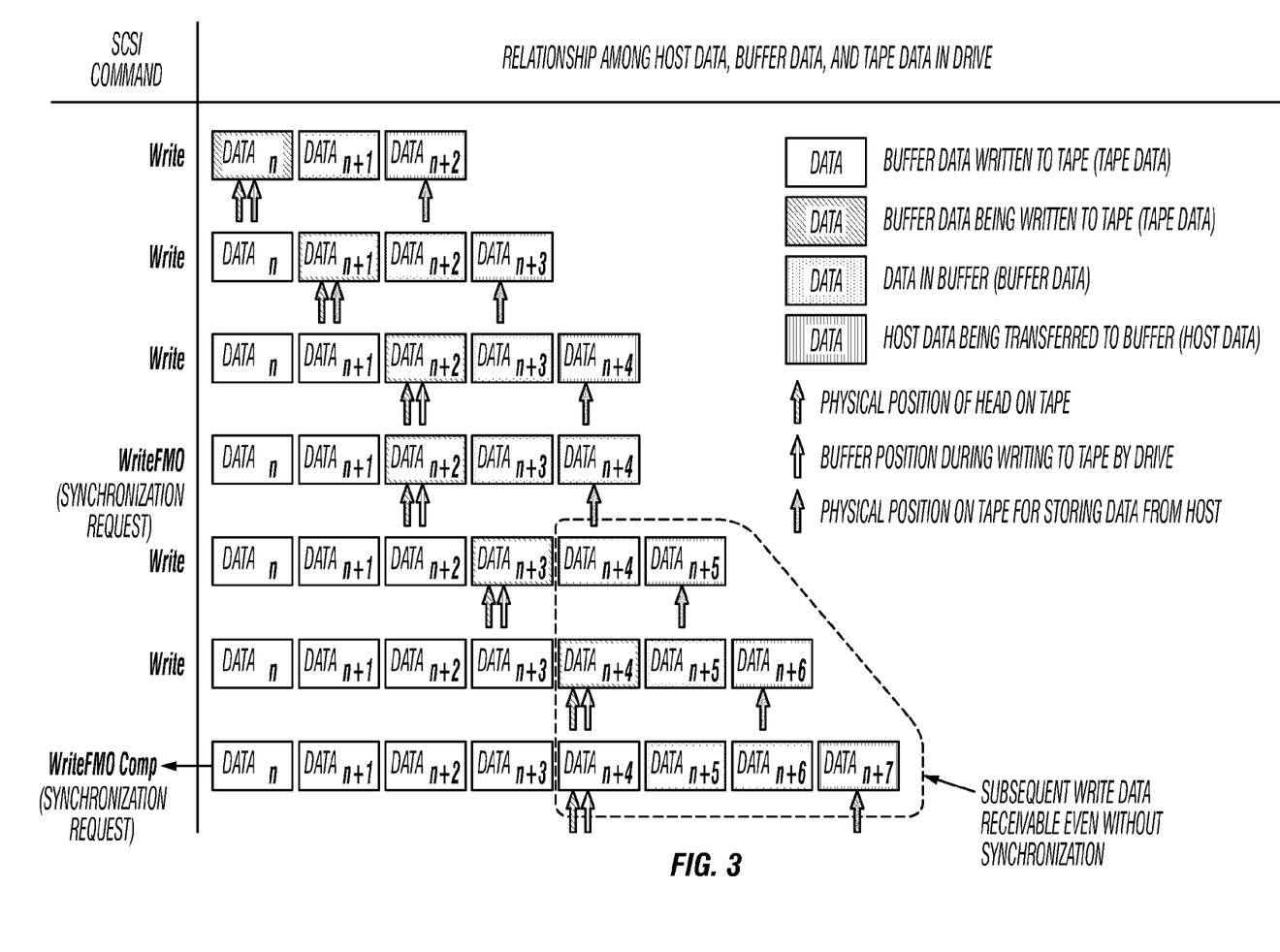
FIG. 3 shows a sequence of transactions performed in a tape drive for Write data and synchronization requests (WriteFM0s).

FIG. 3 shows a sequence of transactions performed in a tape drive in an embodiment for Write data and synchronization requests (WriteFM0s). The transaction sequence shows a relationship among host data pieces (data pieces being transferred from a host to the drive), buffer data pieces (data pieces stored in a buffer), and tape data pieces (buffer data pieces written to a tape) in the drive. The sequence shows transitions during which data pieces n, n+1, n+2, n+3, and . . . are sent according to Write commands from the host with the elapse of time and are stored in segments of the buffer 12.

In one embodiment, a backhitch may be avoided to achieve high speed data writing as follows. Upon receipt of a synchronization command (WriteFM0), the tape drive can receive subsequent Write data pieces, even before a synchronization process is actually completed. The host uses the queuing function to transfer the Write data pieces before the synchronization process is completed. The host sends the drive the Write data pieces n+5, n+6, n+7, . . . without waiting for the completion (Comp) of the synchronization process. The change of transactions in a dotted rectangle in FIG. 3 shows how the drive receives the Write data pieces n+5, n+6, n+7, etc.

As the drive completes the synchronization process (the drive records the data piece n+4 on the tape) up to a buffer position (data piece n+4) stored in a synchronization queue while being receiving the subsequent Write data piece n+7, the drive returns a synchronization completion status at the timing of the completion.

The tape drive is provided with a synchronization queuing function with the following operations.

a) When receiving a synchronization command, the tape drive remembers a "position" in the "buffer" at which the last one of data pieces to be synchronized is stored.

b) The tape drive checks if the last data piece to be synchronized has been written to the tape, while receiving subsequent Write commands.

(c) If the data piece has been written to the tape, the tape drive returns a completion status (Comp) to the host in response to the previously received synchronization command at the completion timing. The synchronization queuing function may be embedded in the interface 11 or the write/read controller 16.

Even if the drive receives multiple synchronization requests, the drive may store a physical buffer position of the last data piece for each synchronization request, in the synchronization queue. When a data piece corresponding to a physical buffer position is recorded on the tape medium, a status is returned in response to a corresponding synchronization request. Thereby, this function supports even nested synchronization requests.

Figure 4:
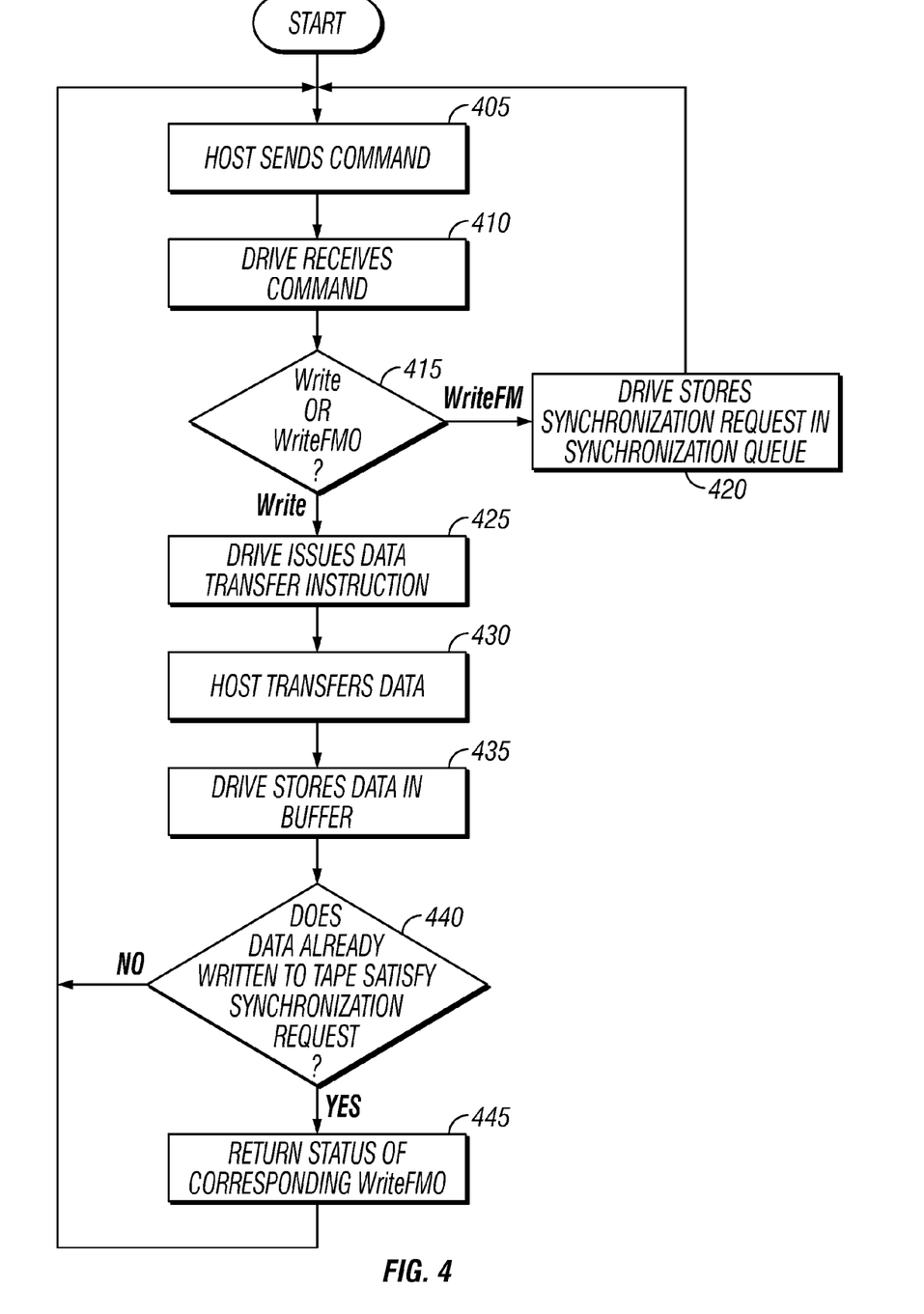
FIG. 4 shows a flowchart of operations performed by a tape drive for multiple write data pieces (write requests and data pieces therefor) and multiple synchronization requests (WriteFM0s).

FIG. 4 shows a flowchart of an operation performed by the tape drive for multiple write data pieces (Write commands and data pieces therefor) and multiple synchronization requests (WriteFM0s). The flowchart illustrates an operation in the simplest case where multiple synchronization requests are not nested.

(1) Step 405: The host issues data writing (a Write command and a data piece therefor) or a synchronization command (WriteFM0) to the drive. Even though a status of a previously sent WriteFM0 command has not been returned, the host uses the queuing function to send the drive the Write command for a data piece to be written next.

(2) Steps 410 and 415: The drive receives the command and discriminates whether the command is a Write command or a WriteFM0 command.

(3) Step 420: If the drive receives a WriteFM0 command from the host in Step 415, the drive stores a buffer position at that time by using the synchronization queuing function.

(4) Step 425: Regardless of whether or not all the data pieces stored in the buffer at the time of receiving a preceding WriteFM0 command have been written to a tape medium, the drive sends the host a data transfer instruction.

(5) Step 430: The host transfers a data piece corresponding to the Write command issued in Step 405.

(6) Step 435: The drive stores the data piece sent from the host in the buffer.

(7) Step 440: The drive checks if a data piece corresponding to the buffer position has been recorded on the tape medium. If data pieces up to the buffer position at the time of receiving the WriteFM0 stored in the synchronization queue in Step 420 have all been recorded on the tape medium, the drive returns a status in response to the WriteFM0 command to the host.

(8) If all of the data pieces have not been recorded, steps 425, 430, 435 and 440 above are repeated for a Write command or a synchronization request (WriteFM0) which follows the preceding command in steps 405, 410, 415 and 420 above.

Examples of time periods associated with the operations may be as follows. As an example, 1000 files are used, each being 10 MB in size, i.e., data pieces having a total size of 10 GB are synchronized on a file basis and written to a tape medium. Parameters are defined as: a media transfer rate is 160 MB/S (equivalent to the rate of an IBM tape drive TS1130); a backhitch time, 5 seconds; and an RABF buffer size, 1 GB. The rate of transferring data from the host to the drive is assumed to be satisfactorily high. Assume a writing without utilizing a RABF in a conventional writing method. Since a synchronization request always involves a backhitch, the required time is obtained by adding a medium writing time and a backhitch time.

$$(10/160) \times 1000 + 5 \times 1000 = 62.5 + 5000 = 5062.5 (Sec)$$

Assume a writing that uses RABF in a conventional writing method. Upon receipt of a synchronization request, the tape drive writes data in an ABF area. When the RABF buffer becomes full, the tape drive rewrites the data to a recursive area. In this case, any data is written to a medium twice. Since a RABF buffer size is 1 GB, a RABF cycle is repeated 10 times. Two backhitches are required in each RABF cycle.

$$2((10/160) \times 1000) + (5 \times 2) \times 10 = 125 + 100 = 225 (Sec)$$

Using the writing method of the invention, a value of $(10/160) \times 1000 = 62.5$ (Sec) may be obtained under the same conditions as in the aforementioned two examples. In one embodiment of the invention, the drive receives a Write command and a write data piece even after receiving a synchronization request, and thus is expected to continue to write data pieces without a backhitch. This evaluation value is calculated on the assumption that the tape drive of the invention requires only a medium transfer time so as to complete writing. The evaluation value shows that the writing method of the invention improves writing performance over the other writing methods.

Embodiments of the invention ensure the completion of a synchronization process while improving the performance of data writing in response to a series of write requests.

The invention claimed is:

1. A tape drive configured for receiving a plurality of write requests for data pieces and a synchronization request corresponding to the write requests from a device and for returning a completion status of the synchronization request to the device, the tape drive comprising:
   an interface for coupling the tape drive to the device, the interface for receiving commands from the device;
   a buffer coupled to the interface and configured for temporarily storing the data pieces received from the device;
   a tape medium, coupled to the buffer, on which the data pieces stored in the buffer are recorded; and
   a write controller, coupled to the interface, the buffer, and the tape medium, that records the data pieces on the tape medium from the buffer, wherein the interface comprises a function for queuing commands received in succession from the device so as to asynchronously process the commands, and the write controller is configured for:
   receiving a first synchronization request for writing first data from the buffer to the tape medium,
   transmitting to the device a request for transferring second data to the buffer subsequent to receiving the first synchronization request and prior to completion of the first synchronization request,
   receiving the second data from the device in response to the request, the receiving occurring subsequent to receiving the first synchronization request and prior to completion of the first synchronization request,
   queuing the second data in the buffer prior to completion of the first synchronization request such that the buffer includes at least a portion of the first data and the second data,
   returning the completion status when processing of the first synchronization request is completed, and
   writing the second data to the tape medium subsequent to completion of the first synchronization request without a physical gap on the tape medium between data written in the first synchronization request,
   wherein receiving and queuing the second data subsequent to receiving the first synchronization request and prior to completion of the first synchronization request prevents the buffer from becoming empty while processing the first synchronization request and prevents the need for the first and second data from being written to the tape medium multiple times.

2. The tape drive according to claim 1, wherein the write controller stores, as a first synchronization request position, a buffer position at which the last one of the data pieces stored in the buffer is located at the time of receiving a synchronization request for the data pieces stored in the buffer.

3. The tape drive according to claim 2, wherein the write controller performs control comprising:
   (1) receiving data pieces corresponding to a plurality of first write requests from the device and storing the data pieces in the buffer;
   (2) receiving a first synchronization request for the data pieces stored in the buffer from the device;
   (3) storing the first synchronization request position by using a synchronization queue;
   (4) receiving a plurality of second write requests as the subsequent write requests from the device while using the command queuing function;
   (5) sending the device data transfer instructions responding to the second write requests;
   (6) storing in the buffer data pieces transferred from the device in response to the data transfer instructions;
   (7) checking if the last data piece stored at the buffer position corresponding to the first synchronization request is recorded on the tape medium;
   (8) if the checking indicates that the data piece stored at the buffer position corresponding to the first synchronization request stored in the synchronization queue has been written to the tape medium, returning a completion status of the first synchronization request; and
   (9) receiving a second synchronization request for the data pieces stored in the buffer from the device and executing the steps (3) to (8) for the second synchronization request and third write requests.

4. The tape drive according to claim 3, wherein the tape drive returns the completion status of the first synchronization request to the device after receiving the second write requests from the device.

5. The tape drive according to claim 4, wherein the tape drive returns the completion status of the first synchronization request to the device after sending the device the data transfer instructions responding to the second write requests.

6. The tape drive according to claim 5, wherein the tape drive returns the completion status of the first synchronization request to the device after receiving further second data pieces corresponding to the data transfer instructions from the device.

7. The tape drive according to claim 6, wherein the tape drive returns the completion status of the first synchronization request to the device after receiving the second synchronization request for the second data pieces from the device.

8. The tape drive according to claim 1, wherein the device is a host that issues the plurality of commands asynchronously to the tape drive.

9. A data writing method by which a tape drive receives a plurality of write requests for data pieces and a synchronization request corresponding to the write requests from a device and returns to the device a completion status of the synchronization request, wherein the tape drive comprises an interface that receives a command from the device, a buffer that temporarily stores the data pieces sent from the device, a tape medium on which the data pieces stored in the buffer are recorded, and a write controller that records the data pieces on the tape medium from the buffer, the tape drive further comprises a function for queuing commands issued in succession from the device so as to asynchronously process the commands, and the method comprises:

receiving a first synchronization request for writing first data from the buffer to the tape medium, transmitting to the device a request for transferring second data to the buffer subsequent to receiving the first synchronization request and prior to completion of the first synchronization request, receiving the second data from the device in response to the request, the receiving occurring subsequent to receiving the first synchronization request and prior to completion of the first synchronization request, queuing the second data in the buffer prior to completion of the first synchronization request such that the buffer includes at least a portion of the first data and the second data, returning a completion status when processing for the first synchronization request is completed, and writing the second data to the tape medium subsequent to completion of the first synchronization request without a physical gap on the tape medium between data written in the first synchronization request, wherein receiving and queuing the second data subsequent to receiving the first synchronization request and prior to completion of the first synchronization request prevents the buffer from becoming empty while processing the first synchronization request and prevents the need for the first and second data from being written to the tape medium multiple times.

10. The method according to claim 9, wherein the write controller stores, as a first synchronization request position, a buffer position at which the last one of the data pieces stored in the buffer is located at the time of receiving a synchronization request for the data pieces stored in the buffer.

11. The method according to claim 10, wherein the write controller performs control comprising:

(1) receiving data pieces corresponding to a plurality of first write requests from the device and storing the data pieces in the buffer;

(2) receiving a first synchronization request for the data pieces stored in the buffer from the device;

(3) storing the first synchronization request position by using a synchronization queue;

(4) receiving a plurality of second write requests as the subsequent write requests from the device while using the function of queuing the commands;

(5) sending the device data transfer instructions responding to the second write requests;

(6) storing in the buffer data pieces transferred from the device in response to the data transfer instructions;

(7) checking if the last data piece stored at the buffer position corresponding to the first synchronization request is recorded on the tape medium;

(8) if the checking indicates that the data piece stored at the buffer position corresponding to the first synchronization request stored in the synchronization queue has been written to the tape medium, returning a completion status of the first synchronization request; and (9) receiving a second synchronization request for the data pieces stored in the buffer from the device and executing the steps (3) to (8) for the second synchronization request and third write requests.

12. The method according to claim 11, wherein the tape drive returns the completion status of the first synchronization request to the device after receiving the second write requests from the device.

13. The method according to claim 12, wherein the tape drive returns the completion status of the first synchronization request to the device after sending the device the data transfer instructions responding to the second write requests.

14. The method according to claim 13, wherein the tape drive returns the completion status of the first synchronization request to the device after receiving further second data pieces corresponding to the data transfer instructions from the device.

15. The method according to claim 14, wherein the tape drive returns the completion status of the first synchronization request to the device after receiving the second synchronization request for the second data pieces from the device.

16. The method according to claim 9, wherein the device is a host that issues the plurality of commands asynchronously to the tape drive.

17. A non-transitory computer-readable medium storing code for data writing to a tape drive including a computer that receives a plurality of write requests for data pieces and a synchronization request corresponding to the write requests from a device and returns to the device a completion status of the synchronization request, wherein the tape drive includes an interface that receives a command from the device, a buffer that temporarily stores the data pieces sent from the device, a tape medium on which the data pieces stored in the buffer are recorded, and a write controller that records the data pieces on the tape medium from the buffer, the tape drive further comprises a function for queuing commands issued in succession from the device so as to asynchronously process the commands, and the code, when executed by the computer, causes the computer to execute the steps of:

receiving a first synchronization request for writing first data from the buffer to the tape medium, transmitting to the device a request for transferring second data to the buffer subsequent to receiving the first synchronization request and prior to completion of the first synchronization request, receiving the second data from the device in response to the request, the receiving occurring subsequent to receiving the first synchronization request and prior to completion of the first synchronization request, queuing the second data in the buffer prior to completion of the first synchronization request such that the buffer includes at least a portion of the first data and the second data, returning the completion status when processing for the first synchronization request is completed, and writing the second data to the tape medium subsequent to completion of the first synchronization request without a physical gap on the tape medium between data written in the first synchronization request, wherein receiving and queuing the second data subsequent to receiving the first synchronization request and prior to completion of the first synchronization request prevents the buffer from becoming empty while processing the first synchronization request and prevents the need for the first and second data from being written to the tape medium multiple times.

18. The non-transitory computer-readable medium according to claim 17, wherein the write controller stores, as a first synchronization request position, a buffer position at which the last one of the data pieces stored in the buffer is located at the time of receiving a synchronization request for the data pieces stored in the buffer.

19. The non-transitory computer-readable medium according to claim 18, wherein the write controller performs control comprising:

(1) receiving data pieces corresponding to a plurality of first write requests from the device and storing the data pieces in the buffer;
(2) receiving a first synchronization request for the data pieces stored in the buffer from the device;
(3) storing the first synchronization request position by using a synchronization queue;
(4) receiving a plurality of second write requests as the subsequent write requests from the device while using the function of queuing the commands;
(5) sending the device data transfer instructions responding to the second write requests;
(6) storing in the buffer data pieces transferred from the device in response to the data transfer instructions;
(7) checking if the last data piece stored at the buffer position corresponding to the first synchronization request is recorded on the tape medium;
(8) if the checking indicates that the data piece stored at the buffer position corresponding to the first synchronization request stored in the synchronization queue has been written to the tape medium, returning a completion status of the first synchronization request; and
(9) receiving a second synchronization request for the data pieces stored in the buffer from the device and executing the steps (3) to (8) for the second synchronization request and third write requests.

20. The non-transitory computer-readable medium according to claim 17, wherein the device is a host that issues the plurality of commands asynchronously to the tape drive.

* * * * *